United States Patent [19]

Froutzis

[11] Patent Number: 4,927,201

[45] Date of Patent: May 22, 1990

[54] MEANS FOR RELEASABLY ANCHORING VEHICLE SEATS

[76] Inventor: Andrew Froutzis, P.O. Box 4110, Elkhart, Ind. 46514

[21] Appl. No.: 291,444

[22] Filed: Dec. 27, 1988

[51] Int. Cl.⁵ .............................................. B60N 1/00
[52] U.S. Cl. .................................... 296/63; 248/503.1
[58] Field of Search ............... 296/63; 248/503.1, 74.4

[56] References Cited

U.S. PATENT DOCUMENTS

| | | | |
|---|---|---|---|
| 191,896 | 6/1877 | Stone | 248/503.1 |
| 1,063,566 | 6/1913 | McFgaters | 248/74.4 X |
| 1,303,345 | 5/1919 | McFgaters | 248/74.4 X |
| 1,928,622 | 10/1933 | Hendee | 248/74.4 X |
| 4,595,164 | 6/1986 | Froutizis et al. | 248/503.1 X |
| 4,638,546 | 1/1987 | Benshoof | 296/63 X |
| 4,645,166 | 2/1987 | Checkley et al. | 248/503.1 |
| 4,783,030 | 11/1988 | Buerhop | 248/74.4 |

*Primary Examiner*—Dennis H. Pedder
*Attorney, Agent, or Firm*—Thomas J. Dodd

[57] ABSTRACT

A device for anchoring a seat to the floor of a vehicle. The device includes a base which has a raised support having a generally flat upper surface for carrying the U-shaped seat supports. Anchor members which include an integral channel part interlock with the base members and applying anchoring pressure to the seat supports.

3 Claims, 3 Drawing Sheets

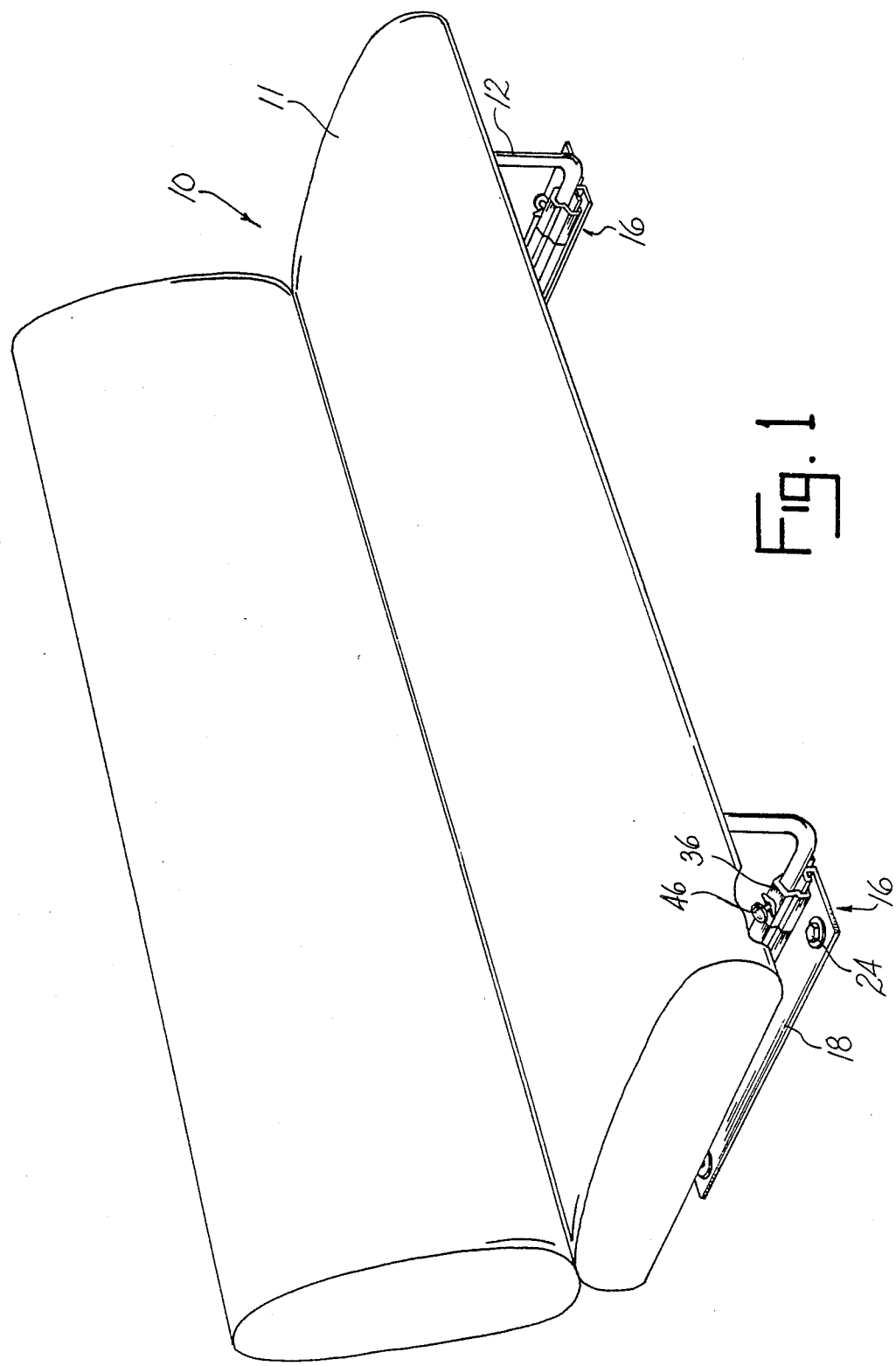

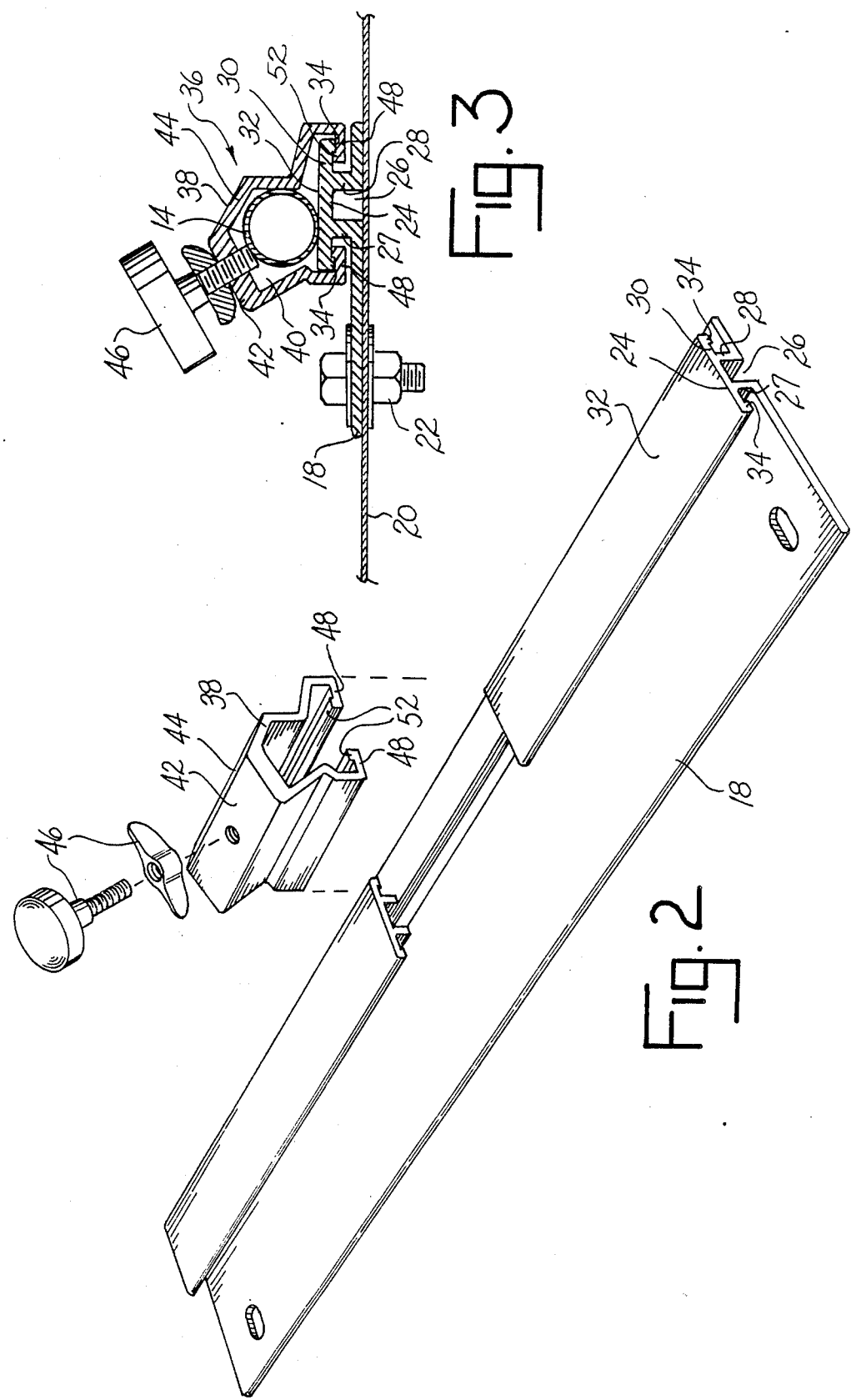

MEANS FOR RELEASABLY ANCHORING VEHICLE SEATS

SUMMARY OF THE INVENTION

This invention relates to devices for securing vehicle seats to the floor and has special application to releasable devices of this type.

Usage of a vehicle, such as a van, for the purpose of hauling cargo often requires the removal of the vehicle rear seats. To facilitate the removal and installation of the seats quick release brackets have been developed such as the one shown in my U.S. Pat. No. 4,595,164.

One problem with such brackets is the lack of space between the seat cushion and the lower frame tube which restricts the use of previous fasteners. The bracket of this invention includes an angularly oriented fastener and anchor part to fit into the small space between the seat cushion and frame tube.

Accordingly, it is an object of this invention to provide a quick release seat bracket which facilitates rapid installation and removal of vehicle seats.

Another object of this invention is to provide for a quick release bracket which is operable in confined and limited areas.

Another object of this invention is to provide for a quick release bracket which is usable with flat top seat frame support rails.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a perspective view of a vehicle seat shown secured by the device of this invention.

FIG. 2 is an exploded view of the frame support and the anchoring device.

FIG. 3 is a cross-sectional view of the anchor securing a seat frame support.

DESCRIPTION OF THE PREFERRED EMBODIMENT

Figure 4:
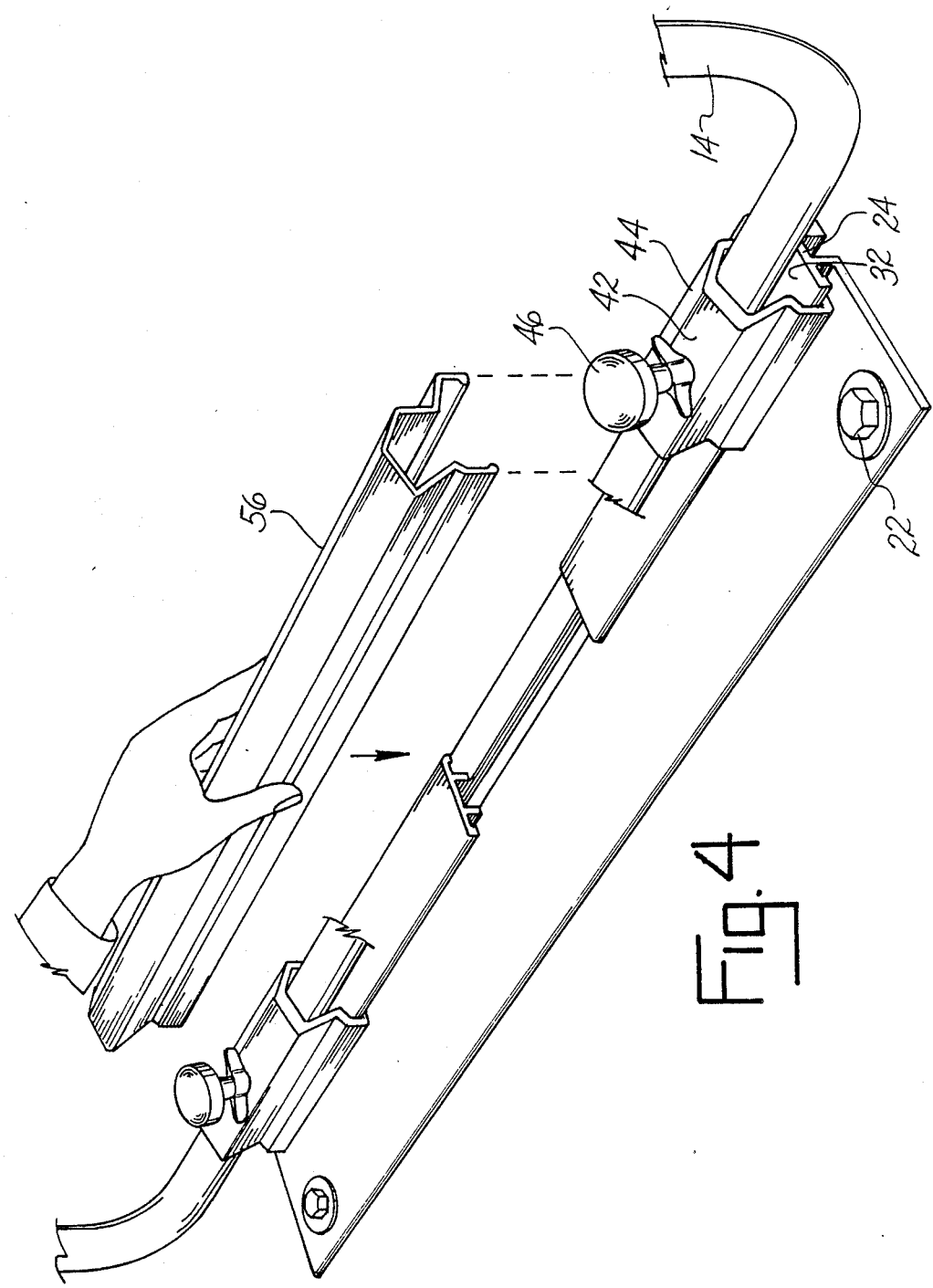
FIG. 4 is a perspective view of the frame support, anchoring device, and the decorative cover.

The preferred embodiment herein described is not intended to be exhaustive or to limit the invention to the precise form disclosed. It is chosen and described to illustrate the principles of the invention, and its application and practical use to thereby enable others skilled in the art to utilize the invention.

Referring now to the drawings, reference numeral 10 refers generally to a vehicle seat which includes lower U-shaped tubular frame supports 12, 14. Seat 10 is generally employed in a vehicle (not shown) such as a van or similar vehicle which may be used both to haul cargo van/or transport passengers.

Reference numeral 16 refers generally to the support rails which support seat 10 above the floor 20 of the vehicle (not shown). Rails 16 are shown in detail in FIGS. 2-3 and include a base 18 which is secured to vehicle floor 20 by fasteners 22 as shown in FIG. 3. Rails 16 also include raised spaced support parts 24 which are generally T-shaped in cross-sectional configuration as shown in FIG. 3 and separated by a gap 26. As shown, each support 24 includes spaced vertical legs 27, 28 and an integral connected support shelf 30 which has a substantially flat upper surface 32. Each support part 24 also includes depending marginal flanges 34 which run for substantially the entire length of each support part.

Reference numeral 36 refers generally to the anchor member which houses the frame supports 12, 14. Each anchor member 36 includes an elongated channel part 38 which defines channel 40 to house frame support 12 or 14. The exact configuration of channel part 38 is not critical except that the top walls 42, 44 should preferably be oriented at an oblique angle with respect to surface 32 if there is little space between the seat cushion 11 and the top walls for inserting the fasteners 46. Each anchor member also includes lower opposed downwardly and inwardly extending integral flanges 48 with an upwardly projecting flange 52 extending therefrom.

As shown in FIG. 2, each support 24 is interrupted at a central portion thereof, to allow the individual fasteners 36 to be installed and slid over the supports after seat frame supports 12 and 14 have been placed atop the upper surface 32. The method of installing anchors 36 is more clearly defined in my U.S. Pat. No. 4,595,164, which is incorporated herein by reference.

Seat 10 is installed and secured to support rails 16 as follows. With the frame supports 12, 14 resting atop rails 16 anchor member 36 is positioned over gap 26 as shown in FIG. 2, and lowered until one of the frame supports is enclosed in channel part 38. Anchor member 36 is then slid over rails 16 with flanges 52 locked against transverse sliding by depending flanges 34 as shown in FIG. 3. Fastener 46 depicted as a thumb screw and wing nut combination is then turned through top wall 42 into bearing contact with support member 12 or 14 to secure the support to rails 16 as shown. Decorative cover 56 may then be snapped over rails 16 as shown in FIG. 4 to provide a finished aesthetic look. To remove the seat 10 for cargo hauling the above procedure is reversed.

It is understood that the invention is not limited to the above details, but may be modified within the scope of the following claims.

I claim:

1. A device for anchoring a seat to the floor of a vehicle, said device comprising a pair of spaced elongated lower horizontal generally flat base members secured to the floor of the vehicle, said seat including a pair of spaced lower supports, each base member including a raised generally T-shaped support part having at least one substantially vertical leg and a substantially flat upper surface overlying said leg and formed in one piece therewith and a marginal flange downturned from said upper surface, said seat lower support overlying and supported on said support part flat upper surface, and an anchor member carried by said base member at opposite ends thereof, each anchor member including an integral channel part, said channel part for accommodating said seat lower support, each anchor member including marginal hook flanges extending downwardly and inwardly relative to said base member marginal flanges wherein said anchor member is slidable longitudinally along the base member, and a fastener threaded through each anchor member channel part bearing on said seat lower support to anchor the seat lower support to the base member and to releasably interlock the hook flanges of said anchor member with the base member marginal flanges.

2. The device of claim 1 wherein the marginal flanges of said base member are interrupted at the central part of each base member to allow said anchor members to be fitted onto the base member over said seat lower supports.

3. A device for anchoring a seat to the floor of a vehicle, said seat having a pair of spaced lower horizontal supports, said device comprising a pair of generally flat base members including a raised generally T-shaped portion each having at least one substantially vertical leg and a substantially flat upper surface overlying said leg and formed in one piece therewith and to underlie and support one of said supports, a pair of anchors removably carried by the opposite ends of each base member, each anchor including an integral channel part to accommodate each support, complementary interengaging parts carried by each base member and anchor, and a fastener threaded in each anchor to engage said seat support and to shift said anchor into interlocking engagement with said base at said interengaging parts.

* * * * *